Nov. 30, 1965  E. C. ARMENTROUT ETAL  3,220,206
REFRIGERATING APPARATUS INCLUDING MEANS
TO INDICATE POWER FAILURE
Filed July 5, 1963  2 Sheets-Sheet 1

INVENTORS
Everett C. Armentrout
Fred L. Pansing
BY
Carl A. Stickel
Their Attorney 3,220,206
REFRIGERATING APPARATUS INCLUDING
MEANS TO INDICATE POWER FAILURE
Everett C. Armentrout, New Carlisle, and Fred L.
Pansing, Brookville, Ohio, assignors to General Motors
Corporation, Detroit, Mich., a corporation of Delaware
Filed July 5, 1963, Ser. No. 292,861
1 Claim. (Cl. 62—127)

This invention pertains to a refrigerating apparatus and more particularly to an indicating system for indicating power failure and/or operational failure of refrigerating apparatus and other applications.

The provision of adequate warning devices for refrigerators and other applications has always been a problem. One of the difficulties is that if there is a power failure, there is no power to operate a warning device and a failure may go unnoticed. Battery powered warning devices have been suggested, but batteries deteriorate with time at varying rates so that unless batteries are replaced regularly the warning system is not sufficiently reliable. Warning systems in which a light is constantly lighted under safe conditions have come into use to avoid the aforementioned difficulties. However, in such a system the extinguishing of the light gives no indication whether this is caused by a power failure or a failure in the apparatus.

It is an object of this invention to provide a simple, inexpensive reliable warning system which will clearly give indication of a power failure and/or an operational failure.

It is another object of this invention to provide a simple, inexpensive reliable warning system which employs components having an expected useful life longer than the apparatus with which they are associated.

It is another object of this invention to provide a refrigerator with an inexpensive reliable warning system visible from its exterior which will indicate not only the failure of refrigeration, but also has a separate indicator for power failure.

It is another object of this invention to provide an indicating system which may also be used to determine the temperature within the refrigerator compartment.

These and other objects are attained in the forms shown in the drawings in which an upright freezer has an indicating system powered from the same power source as the refrigerating system. The indicating system includes a thermistor located in the freezing compartment which is connected in parallel electric circuit with a high resistance neon lamp and this parallel circuit is connected to a series arranged high resistance neon lamp in the circuit which is connected across the supply conductors. A current limiting resistance is also provided in the series circuit arrangement. With this arrangement, as long as the freezing compartment and the thermistor is below a predetermined temperature its resistance will be sufficiently high to cause the neon light in parallel with it to remain illuminated. The combined current through this neon lamp and the thermistor and the applied voltage is sufficient to keep the series neon lamp sufficiently energized to be illuminated. The first mentioned neon lamp is provided for indicating satisfactory refrigerating conditions in the freezing compartment while the second neon lamp is provided for indicating a power failure.

In a second form, the thermistor is again connected in parallel circuit with a neon lamp. However, this parallel circuit is connected in series with a calibrated variable resistance and an audible warning device such as a bell or buzzer. A sufficiently low temperature and consequent high resistance of the thermistor in this second circuit will cause a sufficient voltage difference applied to axial terminals of the neon lamp to cause it to light up. When the temperature of the thermistor rises to an unsafe level its resistance will fall sufficiently that there will be insufficient voltage applied to the neon lamp to keep it lighted. This will indicate excessively high refrigerating temperatures. To determine the temperature of the refrigerated compartment and the environment of the thermistor there is connected to the parallel circuit a series circuit portion including a manually adjustable variable resistance and an audible warning device such as the bell or buzzer. When the refrigerator compartment and the thermistor becomes sufficiently warm to reduce the voltage applied to the neon lamp below its sustaining level, not only will the neon lamp be extinguished, but there will be a sufficiently increased current flow through the thermistor and the variable resistance and the audible warning device such as the buzzer or bell that the buzzer or bell will be energized to supply an audible warning that unsafe temperatures have been reached in the refrigerated compartment. This gives the owner adequate warning to discover the condition of poor refrigeration and if necessary to remove the food in the refrigerator to a properly refrigerated compartment for safe food preservation.

The adjustable resistance is provided with a calibrated temperature scale coordinated with its manual adjustment. When the temperature within the refrigerated compartment becomes sufficiently high the resistance of the thermistor will drop rapidly thereby not only reducing the voltage applied to the neon lamp sufficiently to cause it to be extinguished, but at a sufficiently high temperature also causing a current flow through the buzzer or bell sufficiently to sound an audible warning. The variable resistance may then be adjusted until the buzzer or bell is stopped. This position in which the adjustable resistance at the point at which the audible warning stops indicates the temperature of the refrigerated compartment. For indicating this, it is provided with an indicator cooperating with the temperature scale calibrated to indicate the temperature of the refrigerated compartment.

In a third form, in addition to the thermistor and the neon lamp being connected in the parallel circuit relationship there is also a manually adjustable variable resistance which is likewise connected in parallel with the thermistor and the neon lamp. This adjustable variable resistance is likewise provided with a calibrated temperature scale cooperating with an indicator on the manual adjustment. In series with this parallel circuit is a bell or a buzzer. This circuit is connected across the supply conductors which also connect to the sealed motor compressor unit of the refrigerating system. To secure a temperature indication, the variable resistance is adjusted until the neon light is extinguished. The position of the adjustment at the time the neon light is extinguished determines or serves as a basis of the measurement of the temperatures of the refrigerated compartment. When the thermistor becomes sufficiently warm, its resistance will become sufficiently low to extinguish the neon lamp. This low resistance will also allow greater current flow through the bell or buzzer to give an audible warning to indicate a failure of refrigeration.

Further objects and advantages of the present invention will be apparent from the following description, reference being had to the accompanying drawings wherein preferred embodiments of the present invention are clearly shown.

Figure 1:
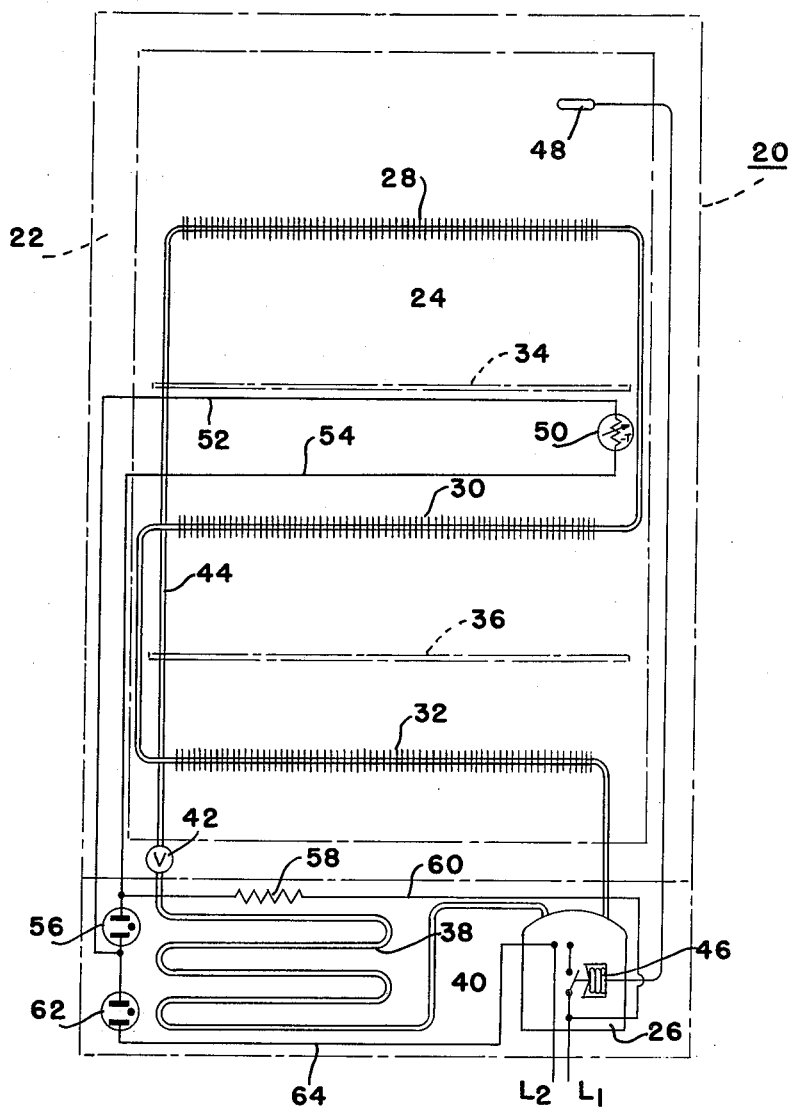
FIGURE 1 is a diagrammatic representation of an upright freezer provided with an electrically operated refrigerating system together with an indicating system powered from the same power source as the refrigerating system having separate indicators for indicating power failure as well as a failure to maintain the refrigerated compartment at the temperature desired.

Referring now more particularly to FIGURE 1 there is illustrated an upright freezer 20 shown diagrammatically as provided with insulated walls 22 enclosing a refrigerated compartment 24 which is maintained at freezing temperatures by the electrically operated refrigerating system which is supplied from the supply conductors $L_1$ and $L_2$. These supply conductors connect to the sealed motor compressor unit 26. Within the refrigerated compartment are three refrigerated shelves 28, 30 and 32 which are connected in series to form the evaporating means for maintaining the compartment 24 at freezing temperatures. Additional shelves 34 and 36 are provided between the refrigerated shelves for additional storage. The sealed motor compressor unit 26 withdraws evaporated refrigerant from the refrigerated shelves 28, 30 and 32 and forwards the compressed refrigerant to a condenser 38 located in the machinery compartment 40 along with the sealed motor compressor unit 26. The refrigerant condenses in the condenser 38 and is forwarded under the control of a suitable flow control means 42 such as an expansion valve or a restrictor through the conduit 44 to the refrigerated shelf 28. The sealed motor compressor unit 26 is controlled by a cycling thermostatic switch 46 connected to and controlled in accordance with the temperature of the thermostat bulb 48 located in the upper portion of the compartment 24.

Freezers of this type are normally used for storing large quantities of frozen food for extensive periods of time. This food is quite valuable and may be severely damaged in the event that freezing temperatures are not maintained in the compartment 24. The items stored and not used every day so that abnormally high temperatures may not be noticed quickly. For this reason food stuffs may spoil before any failure of refrigeration is noticed. It is therefore important that a satisfactory warning device be provided.

According to my invention, I provide in the compartment 24 adjacent a side wall thereof a thermistor 50. This form of a temperature responsive resistance 50 is made of such a material that it has a negative temperature coefficient of resistance so that its resistance decreases sharply within the range of temperatures maintained in the compartment 24. For example, this thermistor 50 may have a resistance of 90,000 ohms at 18° F. which drops to 70,000 ohms at 26° F. This thermistor 50 is connected by the conductors 52 and 54 to opposite sides of the neon bulb or light 56 which is mounted in an exposed position at the front of the machinery compartment 40. Preferably, this neon bulb 56 contains both neon and argon gases and has a firing voltage of about 32 volts. As one specific example, a General Electric NE2J neon bulb may be used.

The parallel circuit made up of the thermistor 50, the neon bulb 56 and the conductors 52 and 54 is connected through a current limiting resistor 58 and a coonductor 60 to one supply conductor $L_1$. The heater 58 is particularly connected to the conductor 54. This parallel circuit is also connected by connecting the conductor 54 to one terminal of a second neon bulb 62 which in turn is connected through the conductor 64 to the second supply conductor $L_2$. This neon bulb 62 is likewise exposed at the front of the machinery compartment and preferably contains only neon gas. Preferably, it has a rated firing voltage of 64 to 85 volts. As one specific example of such a bulb it may be a series 23 General Electric neon bulb. Both bulbs 56 and 62 have a high resistance. The resistance 58 may have a value of 20,000 ohms.

With this system, as long as the power supply is normal, the neon bulb 62 will be continuously lighted. As long as safe refrigerating temperatures are maintained within the compartment 24, the neon bulb 56 will likewise be continuously lighted. The bulbs 56 and 62 will be somewhat different in color since the bulb 56 contains argon and neon gas whereas the bulb 62 contains neon gas alone. The bulb 56 will indicate when illuminated the maintenance of safe refrigerating temperatures and the bulb 62 when illuminated will indicate sufficient power supply. Different color lenses may be provided for the bulbs 56 and 62 to further distinguish their functions. Should there be a failure or refrigeration, the compartment 24 will rise in temperature. The thermistor 50 inherently lowers its resistance with the rising temperature and when the temperature of 26° F. is reached, its resistance will be sufficiently low that insufficient voltage will be applied to the neon bulb 56 to keep it illuminated. The bulb 56 will therefore be extinguished to indicate the failure of proper refrigeration of the compartment 24.

As long as the power supply is sufficient, the neon bulb 62 will remain lighted to indicate satisfactory power supply even though the bulb 56 becomes extinguished. The current flow and sufficient voltage is maintained through the thermistor 50. Should the power supply voltage fall greatly or should the power supply fail completely, the neon bulb 62 will be extinguished to indicate power failure. Both lights will be extinguished by any power failure. Upon a restoration of power, both lights 56 and 62 will be illuminated if the compartment 24 is at a safe temperature, but if the compartment 24 has been at a high temperature, the light 56 will not be illuminated until the temperature of the compartment 24 has been reduced below 18° F. The reason for this is that it requires a higher voltage to start a neon lamp bulb to conduct than is required to keep the bulb conducting and illuminating.

While I prefer to use standard neon bulbs in my circuit as indicated, other high resistance gaseous discharge gas filled diode glow tubes or bulbs may be used if desired. These are preferred to incandescent bulbs whose illumination varies considerably with changes in applied voltage.

Figure 2:
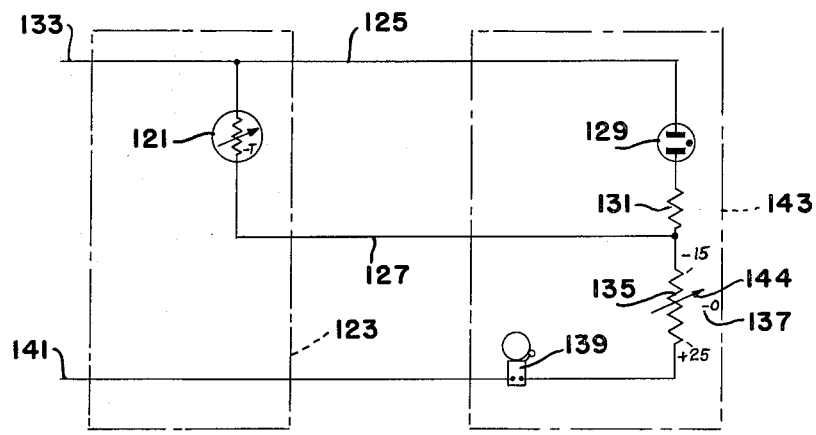
FIGURE 2 is a modified from a wiring diagram for a modified form of indicating system which may be substituted for the indicating system of FIGURE 1.

In FIGURE 2 there is shown a modified form of the invention in which a thermistor 121 is shown located within a refrigerated compartment 123. This thermistor 121 is connected by the conductors 125 and 127 to a gas filled gaseous discharge glow tube or bulb 129 having connected in series with it a current limiting resistance 131. This forms the parallel circuit similar to that in FIGURE 1. The conductor 125 is extended to form the supply conductor 133. Connected to the conductor 127 is a manually adjustable variable resistance 135 having associated with it a temperature scale 137. Connected in series with the variable resistance 135 is an audible electrical warning device 139 which preferably is an electric bell as shown, but which also may be a suitable electric buzzer. This bell 139 is also connected to the supply conductor 141. The neon bulb 129 is a high resistance indicator similar to the neon bulbs 56 and 62 in FIGURE 1. Preferably the tube 129 is also charged with neon-argon gas. This indicating circuit may be substituted for the indicating circuit shown in FIGURE 1. The neon bulb 129, the resistance 131, the variable resistance 135 and the buzzer 139 may be associated with the enclosure of the machinery compartment 40 or it may be grouped on a separate panel 143 which may be placed at a location where it is more readily visible and more easily heard. For example, the refrigerated compartment 123 may be in the basement or in a garage while the panel 143 may be located in the kitchen.

The parallel circuit including the thermistor 121 and the neon bulb 129 operate similarly to the corresponding elements in FIGURE 1. When the refrigerated compartment 123 is at a safe temperature, the resistance of the thermistor 121 will be high and the voltage across the neon bulb 129 will likewise be high in keeping this bulb energized, and indicating a safe operating temperature. Should there be some failure of the refrigerating apparatus, the temperature of the refrigerated compartment 123 and the thermistor 121 will rise thereby inherently reducing its resistance and also reducing the voltage supply to the neon bulb 129. When a dangerous temperature such as 25° F. is reached, the bulb 129 will be extinguished by reason of the reduced voltage applied to it. The lowered resistance of the thermistor 121 will apply increased voltage to the bell 139 causing it to ring and providing an attention arresting audible warning signal indicating the danger to the food in the refrigerated compartment 123 and the possible failure of the refrigerating apparatus. This will indicate the need for immediate attention and service.

The manually adjustable variable resistance 135 provides a means of ascertaining the temperature of the refrigerated compartment 123 under such conditions. This is done by adjusting the value of this resistance 135 until the bell 139 ceases to ring. The indicator 144 associated with the manual adjustment of the variable resistance 135 cooperates with the scale 137 to indicate the temperature of the refrigerated compartment 123 under such circumstances. A power failure will be indicated by the extinguishing of the neon bulb 129 and by the inability to make the bell 139 ring regardless of the adjustment of the variable resistance 135.

Figure 3:
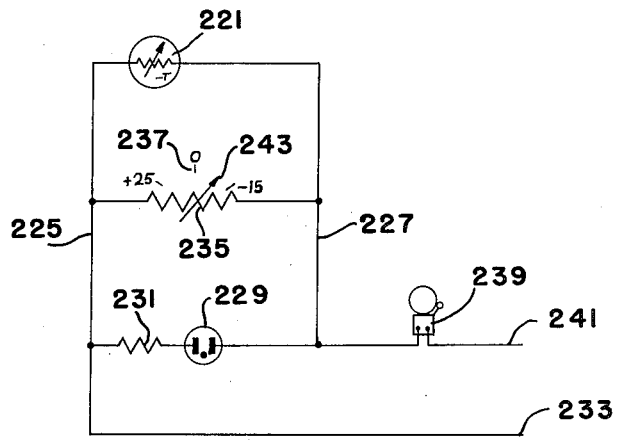
FIGURE 3 is a wiring diagram for another modified form of indicating system.

In FIGURE 3 there is shown a modified system of indication which is somewhat similar to that of FIGURE 2 and which likewise may be substituted for the indicating system of FIGURE 1. The thermistor 221, corresponding to the thermistor 121, is connected by the conductors 225 and 227 in a parallel circuit with a neon bulb 229 and the current limiting resistance 231. The conductor 227 connects through the bell 239 to the supply conductor 241. The conductor 225 connects directly to the supply conductor 233. This circuit differs from the circuit in FIGURE 2 in that the variable resistance 235 is connected between the parallel circuit conductors 225 and 227. In this form the variable resistance 235 has a high maximum value such as 200,000 ohms to which it is adjusted during normal operation.

The thermistor 221, the neon bulb 229 and the bell 239 under such circumstances operate similarly to those of FIGURE 2. When the temperature of the thermistor 221 increases, its resistance will be reduced sufficiently to extinguish the neon bulb 229 and to energize the bell 239. To determine the environmental temperature of the thermistor 221, the manual adjustment of the variable resistance 235 is turned to reduce its resistance until the neon bulb 229 is extinguished and the bell 239 is silenced. For this purpose the variable resistance 235 is provided with an indicator 243 cooperating with scale 237 which is calibrated to indicate the environmental temperature of the thermistor 221.

While I have indicated my indicating system as being applied to refrigerators, it should be understood that it may be used in connection with other temperature controlling devices and other applications and particularly includes the feature of employing high resistance indicators such as the neon bulbs in parallel with and in series with a control device for the purpose of indicating through a parallel circuit arrangement safe operation and satisfactory power supply.

While the embodiments of the present invention as herein disclosed, constitute preferred forms, it is to be understood that other forms might be adopted.

What is claimed is as follows:

A refrigerator including walls enclosing a compartment to be cooled, electrically operated cooling means associated with said compartment for cooling said compartment, power supply conductors connected to said electrically operated cooling means, an indicating system connected across said power supply conductors for indicating failure to maintain adequate refrigerating temperatures in said compartment and/or power failure comprising a parallel circuit having in one branch a temperature responsive resistance located in heat transfer relation with said compartment to be cooled and having in a second branch a gaseous discharge gas filled diode glow tube mounted upon and located to be visible from the exterior of the refrigerator for indicating adequate refrigerating temperatures in said compartment and a second indicating illuminating device mounted upon and located to be visible from the exterior of the refrigerator connected in series with said parallel circuit for indicating power failure, said second indicating device being in the form of a gaseous discharge gas filled diode glow tube.

References Cited by the Examiner

UNITED STATES PATENTS

| 2,769,121 | 10/1956 | Rogoff | 340—228 X |
| 2,826,044 | 3/1958 | Reer | 62—127 |

FOREIGN PATENTS 662,923  7/1938  Germany.

MEYER PERLIN, *Primary Examiner.*